Figure 1:
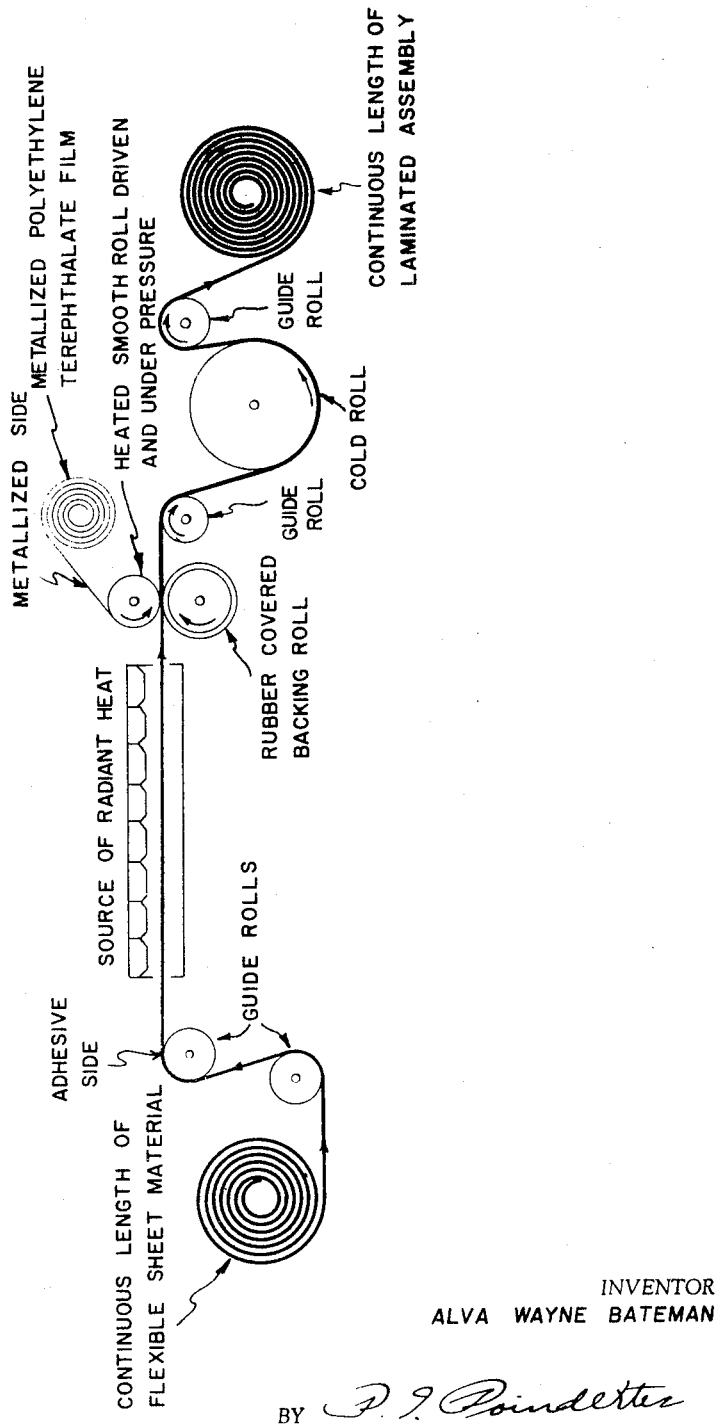

Feb. 22, 1955  A. W. BATEMAN  2,702,580
METALLIC FINISH LAMINATED SHEET MATERIAL
AND PROCESS OF MAKING SAME
Filed April 6, 1954

INVENTOR
ALVA WAYNE BATEMAN

BY

AGENT

United States Patent Office

2,702,580
Patented Feb. 22, 1955

2,702,580

METALLIC FINISH LAMINATED SHEET MATERIAL AND PROCESS OF MAKING SAME

Alva Wayne Bateman, Newburgh, N. Y., assignor to E. I. du Pont de Nemours and Company, Wilmington, Del., a corporation of Delaware Application April 6, 1954, Serial No. 421,387

10 Claims. (Cl. 154—37)

This invention relates to metallic finish laminated materials and more particularly to metallic finish polyvinyl chloride sheet materials with a surface layer of polymeric linear terephthalate ester.

Coated fabrics, unsupported plastic films, coated leathers and similar sheet materials with metallic finishes are well known to the art and have been widely used in the shoe, millinery and novelty trade because of their ornamental appearance. These metallic finishes have been produced by a variety of processes.

One such process involves applying to the surface of the sheet material to be decorated a surface layer of a film-forming composition containing metallic pigment particles. Another process involves applying to the surface of a coated fabric a suitable adhesive, drying the adhesive until it reaches the "dust-free" stage, dusting on the adhesive flat plate-like metal particles, burnishing to orient the particles so that their light reflecting faces are in one plane and finally baking to set the adhesive and hold the particles in the oriented position.

Other processes involve the lamination of thin metal foils to the surface of the flexible sheet materials with a suitable adhesive. Still other processes involve coating metals by vacuum distillation, cathode sputtering and flame coating directly on the surface to be metallized.

These methods result in metallic finishes of various degrees of brightness. The metallic finishes produced by these prior art methods are all subject to damage by abrasion.

It is an object of this invention to provide laminated structures involving a metallic finish on a flexible substrate that is not subject to damage by abrasion. A further object is the provision of a process for uniting a metallized film of polyethylene terephthalate to a flexible substrate by means of an adhesive composition. A more specific object is the provision of a non-dulling highly heat reflecting window shade material.

These and other important objects of this invention are attained by adhering the metallized side of a metallized film of polymeric linear terephthalate to a vinyl chloride polymer containing material by means of an adhesive composition comprising a polymeric alkyl acrylate or polymeric alkyl methacrylate, in which the alkyl group contains 1 to 8 carbon atoms, and a vinyl resin composed of vinyl chloride, vinyl acetate and maleic or similar alpha beta olefinic unsaturated carboxylic acid.

Throughout the specification and appended claims the term "polymeric terephthalate ester" refers to a polymeric linear terephthalate ester of terephthalic acid and a glycol of the series HO(CH$_2$)$_n$OH, where $n$ is a whole number within the range of 2 to 10, such as disclosed in U. S. Patent 2,465,319.

The single figure in the drawing is a diagrammatic side view of an apparatus suitable for carrying out the laminating step in accordance with this invention.

The following specific examples illustrate certain specific embodiments of the invention which are given as illustrations and not limitations. Throughout the specification and claims the percentage and parts figures are expressed on a weight basis.

EXAMPLE I

A non-dulling and highly reflective mirror surface was produced on a polyvinyl chloride coated fabric base material in accordance with the following procedure:

A cotton sheeting fabric running 2.40 yards per pound per 60 inch width, thread count 56 x 60, was diastased, washed and dyed black. The fabric was doctor knife coated on one side with 1 coat of the following composition:

*Base coating composition*

| | Per cent by weight |
|---|---|
| Polyvinyl chloride | 12.0 |
| Dioctyl phthalate | 8.0 |
| Methyl ethyl ketone | 80.0 |
| | 100.0 |

Sufficient of the above composition was applied to deposit about ½ ounce per square yard of non-volatile components. It was passed through a heat zone to expel the methyl ethyl ketone. The coated fabric was calendered by passing between heated pressure rolls to smooth the coating. The coated and calendered fabric was further coated with the following plastisol composition:

*Plastisol coating composition*

| | Per cent by weight |
|---|---|
| Polyvinyl chloride | 48.0 |
| Dioctyl phthalate | 32.0 |
| Bone black | 10.0 |
| Barytes | 10.0 |
| | 100.0 |

The plastisol composition is prepared by grinding the pigment and filler in the dioctyl phthalate, then stirring polyvinyl chloride powder in the pigment/plasticizer mixture at room temperature so as not to colloid the polyvinyl chloride. Sufficient of the plastisol composition is applied to deposit a coating of about 12.0 ounces per square yard. The coated fabric is next passed through a heat zone to heat the plastisol coating up to 300–375° F. at which temperature the polyvinyl chloride is colloided in the dioctyl phthalate and upon cooling a strong tough film results.

The thus described coated fabric was top coated with the following adhesive composition:

| | Parts by weight |
|---|---|
| Vinyl resin ("Vinylite" VMCH) | 21.4 |
| Polymethyl methacrylate | 7.2 |
| Methyl ethyl ketone | 71.4 |
| | 100.0 |

The vinyl resin ("Vinylite" VMCH) in the above formula was a tripolymer, the approximate composition of which may vary within the following limits:

| | Parts by weight |
|---|---|
| Vinyl chloride | 80.0–90.0 |
| Vinyl acetate | 19.7–7.0 |
| Maleic or similar alpha beta olefinic unsaturated carboxylic acid | .3–3.0 |

The "Vinylite" VMCH resin may be produced in accordance with the teaching set forth in U. S. Patent 2,329,456, issued September 14, 1943, to William E. Campbell, Jr., and the limitations set forth in the disclosure of that patent apply here.

Sufficient of the above adhesive composition was applied to the polyvinyl chloride sheet material to deposit approximately .5 ounce of dry adhesive per square yard. The methyl ethyl ketone was evaporated by passing the material through a heat zone. Immediately after drying the adhesive coat and while it was at an elevated temperature and tacky, it was brought in contact with the metallized side of a .25 mil film of polyethylene terephthalate by means of pressure rolls. Alternately after the top coat is applied and dried the coated fabric may be stored and the top coat reheated immediately prior to laminating it to the metallized side of the polyethylene terephthalate film by means of an apparatus as illustrated in the drawing.

The polyethylene terephthalate film may be metallized by means of vacuum distillation of aluminum and certain aluminum alloys as described in one or more of the following U. S. Patents: 2,664,852; 2,665,223; 2,665,224; 2,665,225; 2,665,226; 2,665,227; 2,665,228; and 2,665,229.

The metallized side of the polyethylene terephthalate film was firmly attached to the polyvinyl chloride coating and withstood about 300 mechanical scrubs before there was any separation of the metallized film from the base material. The mechanical scrub test was carried out on an apparatus illustrated in Automotive Industries, 49, 1262-6. The mechanical scrub test simulates the condition of taking a strip of material about 6 inches long and two inches wide and firmly grasping each end between the thumbs and forefingers of each hand, making a slight S fold between each hand, and vigorously rubbing the material back and forth upon itself while under pressure.

The product had a highly lustrous metallic finish that was scuff resistant and particularly adapted for fabrication into ladies' handbags and evening slippers.

Polyvinyl chloride unsupported films may be substituted for the polyvinyl chloride coated fabric in the above example as the base material to which the metallized film is laminated by means of the same adhesive composition and in like manner. The woven cotton fabric may be replaced with knitted fabrics as well as non-woven fabrics such as those disclosed in copending application S. N. 267,911 filed January 23, 1952, now abandoned. The fabric substrate for the polyvinyl chloride coating may be formed from a variety of synthetic fibers such as, e. g., polyethylene terephthalate, polyacrylonitrile, nylon, glass, etc., in either woven, non-woven or knitted form.

EXAMPLE II

A window shade material highly heat reflecting on one side was made by coating a cotton sheeting running 4.73 yards per pound per 38½″ width, thread count 72 x 72, with one coat of the following composition on each side:

| | Parts by weight |
|---|---|
| Vinyl resin (copolymer of 85 parts of vinyl chloride and 15 parts of vinyl acetate) | 19.5 |
| Phthalic diester of ethylene glycol | 1.9 |
| Triphenyl phosphate | 1.9 |
| Pigments | 18.2 |
| Methyl ethyl ketone | 58.5 |
| | 100.0 |

The coated fabric was passed through a heat zone to expel the volatile solvent and then through pressure rolls to smooth and consolidate the coating and fabric. Sufficient composition was applied to deposit about .8 ounce of dry coating per square yard on each side.

The coated fabric was given an additional coat on each side of the following composition:

| | Parts by weight |
|---|---|
| Vinyl resin (copolymer of 90 parts of vinyl chloride and 10 parts of vinyl acetate) | 15.0 |
| Polyvinyl chloride (homopolymer) | 2.0 |
| Pigments | 17.4 |
| Dioctyl phthalate | 4.7 |
| Methyl ethyl ketone | 60.9 |
| | 100.0 |

Sufficient of the above composition was applied to deposit an additional 0.4 ounce of dry coating per square yard on each side.

One side of the coated fabric was given further coating with one coat of the following adhesive composition:

| | Parts by weight |
|---|---|
| Vinyl resin "Vinylite" VMCH (same as Example I) | 22.5 |
| Polymethyl methacryalte | 7.5 |
| Di (ethyl hexyl) phthalate | 13.0 |
| Methyl ethyl ketone | 57.0 |
| | 100.0 |

Sufficient of the above adhesive composition was applied to the one side of the coated fabric to deposit about 0.5 ounce of dry coating per square yard. After drying the coated fabric was rolled up and stored at this stage.

Subsequently a .25 mil polyethylene terephthalate film, metallized on one side (same as in Example 1), was laminated to the side of the coated fabric with the adhesive coat by means of an apparatus illustrated in the drawing, with the metallized side of the polyethylene terephthalate film contiguous with the adhesive layer. The adhesive or bonding coat was activated just prior to being brought in pressure contact with the metallized side of the polyethylene terephthalate film by passing under a source of radiant heat.

The adhesive composition of this invention may contain from 5% to 50% of polymeric acrylate or polymeric alkyl methacrylate, in which the alkyl group contains 1 to 8 carbon atoms, based on the combined weight of the acrylate or methacrylate and the vinyl resin.

In the interest of brevity a specific example illustrating each polymeric alkyl acrylate or polymeric alkyl methacrylate that may be blended with the vinyl resin in the adhesive composition is not given, however, it will be understood that the polymeric alkyl methacrylates and the polymeric alkyl acrylates, in which the alkyl group contains 1 to 8 carbon atoms, may be substituted on a pound for pound basis for the polymethyl methacrylate used in the specific examples of the adhesive composition.

In place of polyvinyl chloride in the flexible base material it will be readily apparent that copolymers of vinyl chloride and other materials copolymerizable therewith such as vinyl acetate, lower alkyl fumarates such as methyl and ethyl fumarates, acrylic and methacrylic esters, and vinylidene chloride are useful materials in preparing the base materials to which the metallized side of metallized polyethylene terephthalate film may be adhered. In the claims the term "vinyl chloride polymer" is used to denote both homopolymers and copolymers.

Polyvinyl chloride coated leather may also be used as the base material to which the metallized polyethylene terephthalate film is laminated with the adhesive composition described above.

In place of the linear polyethylene terephthalate used in the specific examples the highly polymerized esters obtained by the reaction of terephthalic acid and polymethylene glycols having more than two but not more than 10 methylene groups may also be used in this invention; such as, e. g., trimethylene glycol, tetramethylene glycol, hexamethylene glycol, heptamethylene glycol, octamethylene glycol, nonamethylene glycol and decamethylene glycol. The glycols having 2 to 4 methylene groups are preferred.

There is no particular limit to be placed on the thickness of the polymeric terephthalate ester surface film. For economic advantages it is desirable to use as thin a film as possible and .25 mil thick films have been found well suited for the products of this invention. Where flexibility is not important much thicker polymeric terephthalate ester films may be used, such as, e. g. 4 to 5 mils thick.

Colored metallic finishes may be made by applying a suitably colored translucent composition as an ultimate surface coat to laminated assembly described above. For the colored composition a solution of polyethylene terephthalate in highly polar solvents such as formamide, nitrobenzene, phenol and meta cresol, at relatively high temperatures, containing spirit soluble dyes may be used.

Unusual surface effects may be realized by using an engraved steel roller in place of the smooth surface roller for the laminating step. The laminated products of this invention may also be embossed by conventional embossing equipment such as roller or plate embossing apparatus.

The products of this invention may be laminated to bulky non-woven webs, such as, e. g., those described in copending applications S. N. 267,911, now abandoned and S. N. 267,912, filed January 23, 1952, by E. A. Rodman. In this feature of the invention the side of the flexible base material opposite the metallic finish is cemented to the bulky non-woven webs by means of suitable adhesives, such as, e. g., a solution of polyvinyl chloride resin or copolymer of vinyl chloride and vinyl acetate in a ketone solvent, such as, e. g., methyl ethyl ketone.

The products of this invention combine the advantages of the high luster of a polished metallic surface with the flexibility and the other advantageous properties of the flexible backing materials. The products of this invention are greatly superior to the combination of metal foil combined to flexible base materials in that the finished product can be subjected to repeated scrubbing as described above, without disturbing the metallic finish. They are also more supple than the metal foil laminated products. The products of this invention are extremely scuff resistant. The metallic finish is also protected from oxidation or other corrosive conditions by the layer of polyethylene terephthalate. The polyethylene terephthalate surface is also extremely solvent resistant to most common organic solvents.

Thus in various physical characteristics the products of the present invention have distinctively desired characteristics of practical value not possessed by prior are metallized finishes on flexible back materials.

It is apparent that many widely different embodiments of this invention may be made without departing from the spirit and scope thereof and, therefore, it is not intended to be limited except as indicated in the appended claims.

I claim:
1. A highly lustrous laminated assembly comprising a flexible base material, the surface of which comprises a vinyl chloride polymer, an intermediate adhesive layer containing a tripolymer of from 80% to 90% vinyl chloride, from 19.7% to 7.0% of vinyl acetate and from .3% to 3.0% of an alpha beta olefinic unsaturated carboxylic acid, and an acrylic polymer selected from the group consisting of polymeric alkyl acrylates and polymeric alkyl methacrylates, said alkyl group containing 1 to 8 carbon atoms, said adhesive layer being contiguous with said surface, and a surface layer comprising a film of polymeric linear terephthalate metallized on one side, the metallized side of said film being contiguous with said adhesive layer, the acrylic polymer in the adhesive layer comprising 5% to 50% of the combined weight of the acrylic polymer and the tripolymer in the adhesive layer.

2. The product of claim 1 in which the vinyl chloride polymer in the base material is a homopolymer of vinyl chloride.

3. The product of claim 1 in which the acrylic polymer in the adhesive layer is polymethyl methacrylate.

4. The product of claim 1 in which the polymeric linear terephthalate is polyethylene terephthalate.

5. The product of claim 1 in which the polymeric linear terephthalate film is about .25 mil thick.

6. A highly reflective window shade material comprising a fabric base coated on each side with a vinyl chloride polymer containing composition, an intermediate adhesive layer firmly attached to one side of said coated fabric, said adhesive layer comprising a tripolymer of from 80% to 90% vinyl chloride, from 19.7% to 7.0% of vinyl acetate, and from .3% to 3.0% of an alpha beta olefinic unsaturated carboxylic acid, and an acrylic polymer selected from the class consisting of polymeric alkyl acrylates and polymeric alkyl methacrylates, said alkyl group containing 1 to 8 carbon atoms, and a surface layer of a film of polymeric linear terephthalate metallized on one side, the metallized side of said film being firmly attached to said adhesive layer, the acrylic polymer in the adhesive layer comprising 5% to 50% of the combined weight of the acrylic polymer and the tripolymer in the adhesive layer.

7. The process which comprises coating the surface of a flexible vinyl chloride polymer containing base material with an intermediate adhesive composition, said adhesive composition comprising a volatile solvent and a tripolymer of from 80% to 90% vinyl chloride, from 19.7% to 7.0% vinyl acetate and from .3% to 3.0% of an alpha beta olefinic unsaturated carboxylic acid, and an acrylic polymer selected from the class consisting of polymeric alkyl acrylates and polymeric alkyl methacrylates, said alkyl group containing 1 to 8 carbon atoms, removing the volatile solvent from the adhesive composition, and pressing the metallized side of a metallized polymeric linear terephthalate film against the dry adhesive composition while said adhesive is at an elevated temperature, the acrylic polymer in the adhesive composition comprising 5% to 50% of the combined weight of the acrylic polymer and tripolymer in the adhesive composition.

8. The process of claim 7 in which the vinyl chloride polymer is a homopolymer of vinyl chloride.

9. The process of claim 7 in which the polymeric linear terephthalate is polyethylene terephthalate.

10. The process of claim 7 in which the acrylic polymer in the adhesive composition is polymethyl methacrylate.

References Cited in the file of this patent

UNITED STATES PATENTS

| Number | Name | Date |
|---|---|---|
| 2,039,372 | Wickmann | May 5, 1936 |
| 2,310,712 | Schmied | Feb. 9, 1943 |
| 2,525,863 | Carter | Oct. 17, 1950 |
| 2,613,168 | Totten | Oct. 7, 1952 |